United States Patent [19]
Custer

[11] 3,806,065
[45] Apr. 23, 1974

[54] ADJUSTABLE GEOMETRY AIRFOIL IN CHANNEL WINGED AIRCRAFT

[76] Inventor: Willard R. Custer, 1905 W. Washington St., Hagerstown, Md. 21749

[22] Filed: Mar. 11, 1971

[21] Appl. No.: 123,334

[52] U.S. Cl............... 244/12 CW, 244/43, 244/123
[51] Int. Cl.............................................. B64c 3/10
[58] Field of Search........... 244/12 CW, 43, 44, 40, 244/123, 124

[56] References Cited
UNITED STATES PATENTS
3,123,321   3/1964   Custer........................ 244/12 CW
2,350,809   6/1944   Pelessoni........................... 244/43

Primary Examiner—Milton Buchler
Assistant Examiner—Barry L. Kelmachter
Attorney, Agent, or Firm—Raphael Semmes

[57] ABSTRACT

A plurality of movable sections form a substantial portion of the upper airfoil surface of the channel of a channel winged aircraft. The sections may be shifted in a fore and aft direction by power means in order to selectively change the geometry of the channel airfoil section.

4 Claims, 6 Drawing Figures

PATENTED APR 23 1974 3,806,065
SHEET 1 OF 2
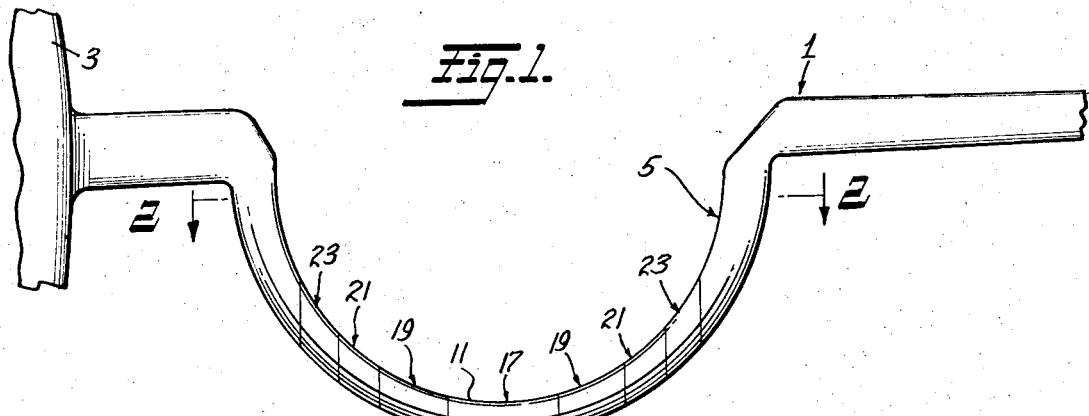
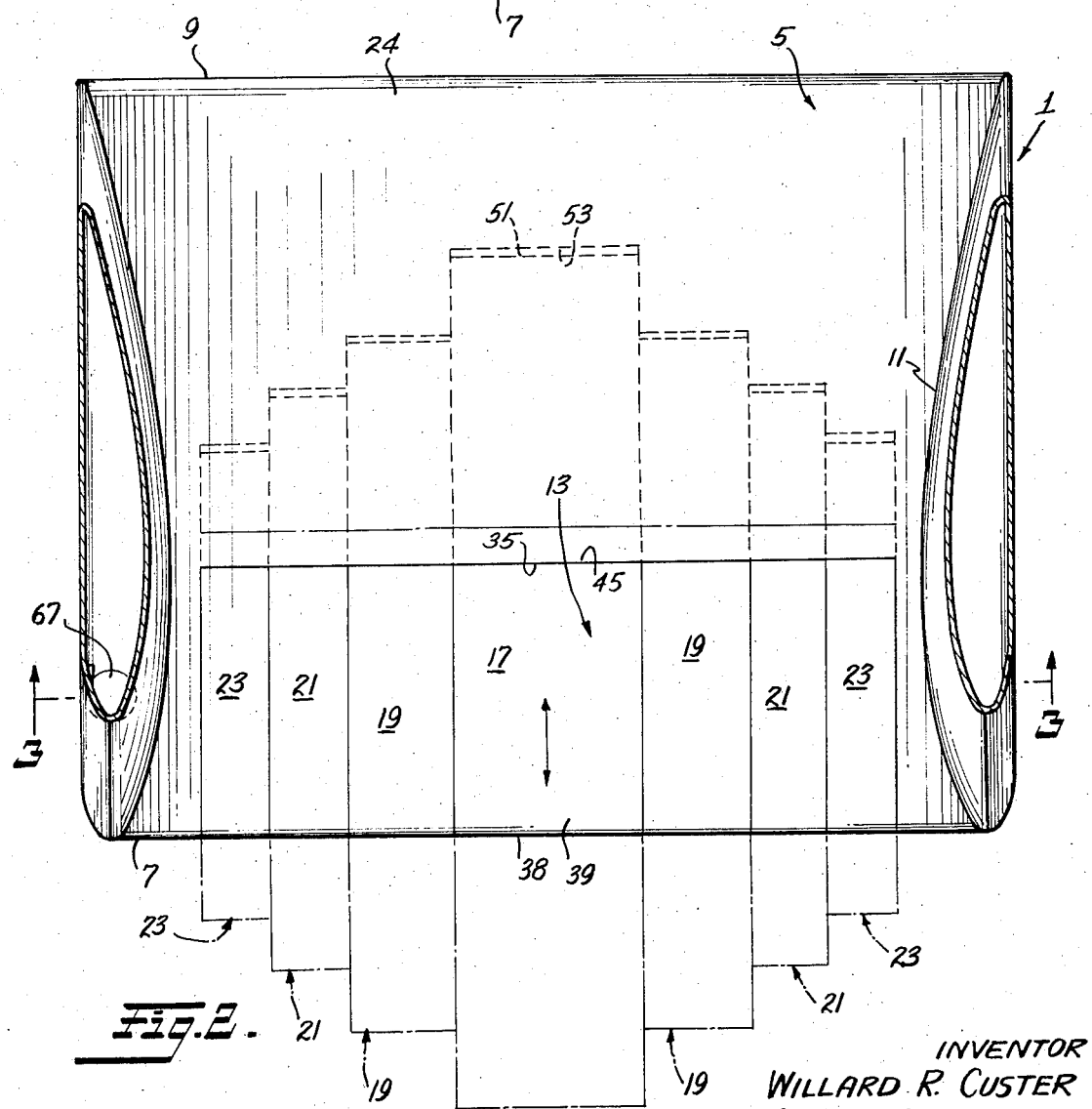
INVENTOR
WILLARD R. CUSTER
BY Raphael Semmes
ATTORNEY

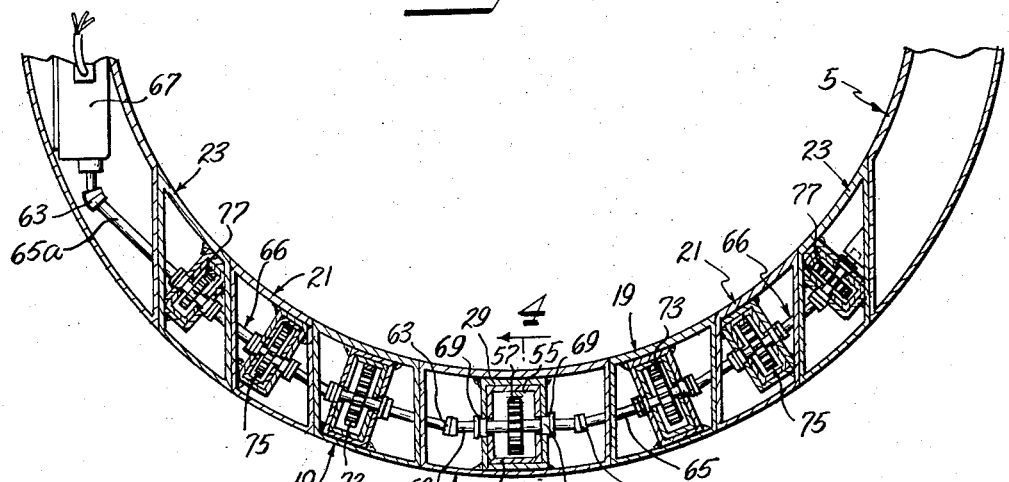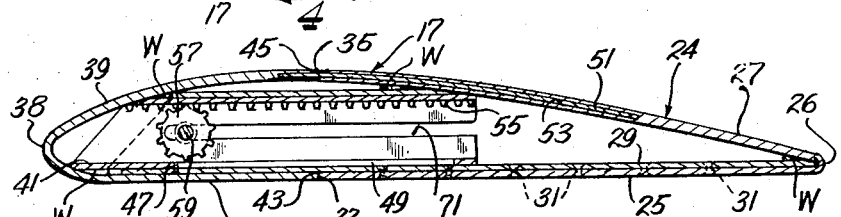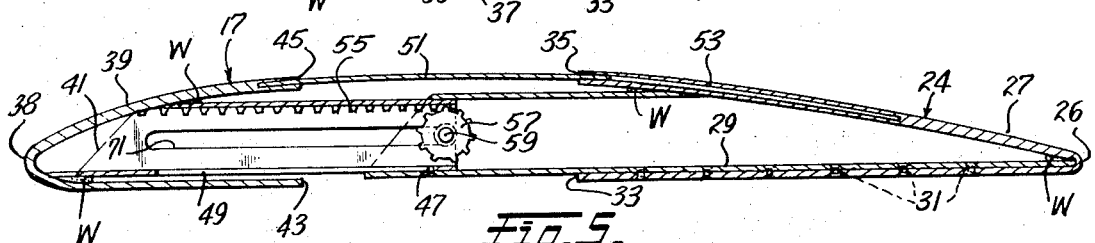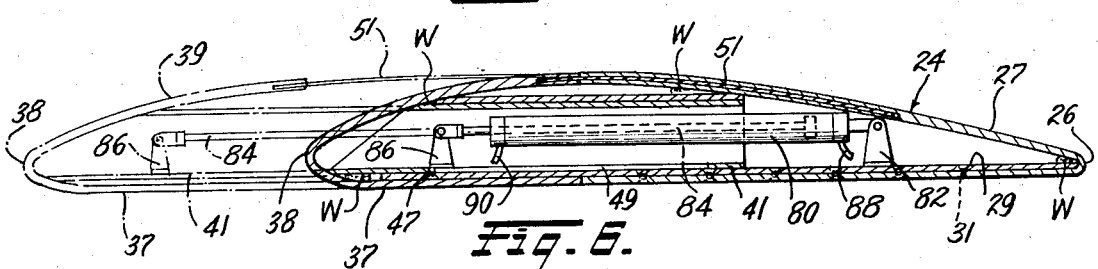

ADJUSTABLE GEOMETRY AIRFOIL IN CHANNEL WINGED AIRCRAFT

BACKGROUND OF THE INVENTION

In the past, aircraft have been provided with extensible and retractable lift surfaces. For example, in U.S. Pat. No. 3,123,321, there is disclosed a channel winged aircraft in which the trailing edge of the channel structure is provided with an extension which is rearwardly projectable and retractable for the purpose of varying the spacing of the propeller tip with respect to the trailing edge of the channel in order to meet varying flight and take-off requirements. In U.S. Pat. No. 2,721,045, an upwardly opening extendable channel 21 is shown mounted for fore and aft movement with respect to the leading edge of the air intake duct for the purpose of varying the lift at the nose of the aircraft. However, as disclosed in the prior art, it was not possible to selectively adjust the geometry of the upper surface of the forward portion of the airfoil in a channel winged aircraft.

SUMMARY OF THE INVENTION

The present invention relates to improvements in channel winged aircraft wherein there is provided means for selectively varying the contour of the channel airfoil and the degree of lift provided by the channel surface.

It is an object of the invention to provide the lift surface adjacent the leading edge of a channel winged aircraft with an adjustable airfoil.

Another object of the invention is to provide the upwardly open channel of an aircraft with a leading edge airfoil which may be moved fore and aft of the fixed main channel.

It is also an object of the invention to provide an aircraft lift channel which imparts a normal lift when in a retracted position and which imparts a greater lift when in a projected position.

These and other objects and advantages of the invention will become more apparent from the following detailed description of preferred forms of the invention when taken in conjunction with the drawings, in which:

FIG. 1 is a fragmentary, front elevation view of one wing of a channel winged aircraft incorporating the adjustable airfoil of the present invention;

FIG. 2 is an enlarged plan view of the improved channel taken on the line 2—2 of FIG. 1 showing the sliding sections of the adjustable airfoil in the fully retracted position in solid lines and in fully projected position in phantom lines;

FIG. 3 is a fragmentary, sectional view of one form of the invention taken on the line 3—3 of FIG. 2;

FIG. 4 is a sectional view taken on the line 4—4 of FIG. 3 showing the airfoil section at the leading edge of the channel in the retracted position;

FIG. 5 is a view similar to FIG. 4 showing the airfoil section at the leading edge of the channel in the extended or projected position; and FIG. 6 is a sectional view of a modified form of the invention similar to FIGS. 4 and 5 but showing a fluid motor for moving the airfoil sections at the leading edge of the channel between the retracted position shown in full lines and the extended position shown in phantom lines.

For the purpose of illustrating the invention, only a portion of one wing 1 is shown extending outwardly from one side of the body or fuselage 3 of an aircraft. It is understood, of course, that the structure and arrangement to be described is also incorporated in a similar channel at the other side of the aircraft.

The upwardly opening channel portion 5 of the wing 1 is of generally U-shaped configuration and extends longitudinally of the aircraft wing from the leading edge 7 to the trailing edge 9 thereof. As viewed in transverse cross-section, the upwardly facing surface 11 of the U-shaped channel 5 is of generally concave airfoil configuration, and the channel is preferably of concave configuration as viewed in elevation, FIGS. 1 and 3.

The airfoil surface 13 at the leading edge of the U-shaped channel 5 is divided into a plurality of elongated movable sections disposed in side by side relationship. The movable sections include a central section 17, positioned at the bottom of the U-shaped channel 5 and midway between the opposite sides thereof, and a plurality of lateral sections 19, 21 and 23 disposed on either side of the central section.

The central section 17 and the lateral sections 19, 21 and 23 slide between a retracted position with the leading edge of each of the sections disposed substantially coextensive with the leading edge of the U-shaped channel 5, as shown in full lines in FIGS. 2, 4 and 6, and a projected position as shown in phantom lines in FIGS. 2 and 6 and in solid lines in FIG. 5. The sections 17, 19, 21 and 23 vary in length with the central section 17 being the longest one, the lateral sections 19 being somewhat shorter than the central section 17, the lateral sections 21 in turn being shorter than the lateral sections 19, and the lateral sections 23 being shorter than the lateral sections 21.

Each of the sections 17, 19, 21 and 23 is mounted for sliding fore and aft movement in the U-shaped channel 5. As best shown in FIGS. 4, 5 and 6, the trailing portion 24 of the U-shaped channel 5 includes a bottom wall portion 25 and a top wall portion 27 which extends forwardly and upwardly of the U-shaped channel 5 from the trailing edge 26 of the bottom wall 25. The sliding sections 17, 19, 21 and 23 are each mounted in a similar manner in the U-shaped channel 5, and therefore the construction and arrangement of only one of the sections will be described in detail.

An elongated housing or tunnel 29 of generally rectangular configuration as viewed in transverse cross-section is provided for supporting and guiding each of the sliding sections 17, 19, 21 and 23. Each of the housings 29 is fixed in the trailing edge portion 24 of the U-shaped channel 5 by the welds W and a plurality of rivets 31, and the housings are disposed in a fore and aft, side by side relationship with the outer open end of each housing 29 extending a substantial distance in advance of the terminal edges 33 and 35 of the bottom and top walls 25 and 27 respectively.

The sliding sections 17, 19, 21 and 23 include a bottom wall 37 which curves upwardly at its forward end and joins a top wall 39 which extends upwardly and rearwardly from the leading edge 38 to provide a portion of the airfoil of the U-shaped channel 5.

Each sliding section 17, 19, 21 and 23 includes an elongated tube member 41 fixed in the respective sliding section, as by the welds W, and extends rearwardly toward the trailing edge portion 24 of the U-shaped channel 5 and into a cooperating housing 29. The outer, open, free end of the tubes 41 extend rearwardly for a substantial distance beyond the trailing edges 43 and 45 of the bottom and top walls 37 and 39 respectively.

The housing 29 and the tube 41 of each of the sliding sections 17, 19, 21 and 23 are of such cross-sectional dimensions that the tube 41 has a close, sliding, telescoping fit in the corresponding housing 29. When the sliding sections 17, 19, 21 and 23 are in the retracted position as shown in FIG. 4, the edges 43 and 45 of the sliding sections are in abutment with the opposed edges 33 and 35 of the trailing portion 24 of the U-shaped channel 5. The degree of telescoping movement of each of the sliding sections 17, 19, 21 and 23 to the projected position illustrated in FIG. 5 may be limited by suitable means, for example by a pin 47 rigid with the housing 29, extending into a slot 49 formed in the tube 41.

In order to provide a continuous airfoil surface in the U-shaped channel 5 when the sections 17, 19, 21 and 23 are in a projected position, each of the sliding sections carries a flap 51 which is fixed, as by rivets or welding, at its forward end to the trailing edge of the top wall 39. Each of these flaps extends rearwardly and the trailing edge is received in an opening 53 which extends inwardly from the edge 35 of the trailing portion 24 of the U-shaped channel. Alternatively, the flaps 51 could be supported by suitable straps or the like secured to the underside of the top wall 27.

Each sliding section 17, 19, 21 and 23 carries an elongated gear rack 55 on the inner surface of the top wall of the tube 41 with the teeth facing downwardly. The rack 55 of each of the sliding sections extends substantially the entire length of the corresponding tube 41, and each rack is in engagement with a spur gear 57 fixed on a short shaft 59 journaled for rotation in suitable bearings 61 mounted in alignment in the side walls of the corresponding housing 29 adjacent the forward end thereof. The shafts 59 are connected together by the universal joints 63 and by the short connecting sections of shafting 65 to provide an elongated articulated drive shaft 66 which extends through the hollow portion of the U-shaped channel 5 and through the sliding sections 17, 19, 21 and 23 for simultaneously driving each of the spur gears 57. A suitable motor 67 secured to one end of the shafting section 65a by a universal 63, and controllable by the pilot of the aircraft, is employed for rotating the drive shaft 66 in either direction. Axial movement of the articulated drive shaft 66 is prevented by means of the thrust members 69 secured to the shaft 59 of the central sliding section 17 at either side of the housing 29 and in bearing engagement with the opposed end of the respective bearing 61.

The tube members 41 are provided with elongated slots 71 in the side walls thereof through which the shaft 59 of the respective sliding section passes freely in order to permit the sliding sections to move between the extended and retracted position. Obviously, the articulated drive shaft 66 could be replaced by other suitable drive means such as, for example, a heavy flexible cable to which each of the spur gears 57 would be attached.

It is desirable to have the central sliding section 17 project outwardly beyond the leading edge 7 of the U-shaped channel 5 a greater distance than the lateral sections 19 and, in turn, to have the lateral sections 19 extend outwardly a greater distance than the lateral sections 21, and the lateral sections 21 extend outwardly a greater distance than the lateral sections 23, as shown in phantom lines in FIG. 2. As indicated above, the central sliding section 17 is longer than the lateral sections on either side and the lateral sections are progressively shorter as the distance from the central section increases.

In order to drive the sections 17, 19, 21 and 23 simultaneously between the retracted and the projected positions, and at the same time to have the central section travel at a faster rate than the lateral sections 19, and the lateral sections 19 to travel at a faster rate than the lateral sections 21 and, in turn, to have the lateral sections 21 travel at a faster rate than the lateral sections 23, one satisfactory arrangement is to provide the lateral sections 19 with spur gears 73 which are smaller in diameter than the spur gear 57 mounted in the central section 17 and which have fewer teeth than the spur gear 57. In like manner, the lateral sections 21 are provided with spur gears 75 which are smaller in diameter and contain fewer teeth than the spur gears 73 of the lateral sections 19 and, in turn, to provide the sections 23 with spur gears 77 which are smaller in diameter and have fewer teeth than the spur gears 75 of the sections 21. By means of this arrangement, when the sliding sections are moved from the retracted toward the projected position by rotating the drive shaft 66, the central section 17 will move at a greater rate of speed and will move a greater distance than the adjacent lateral sections 19 which, in turn, will move at a greater rate and for a greater distance than the next adjacent lateral sections 21, etc. When the sliding section 17, 19, 21 and 23 are moved from the projected to the retracted position, the same relationship will exist between the sections as to the rate of speed and to the distance traveled as described above. In the fully projected position the central section and the lateral sections assume the position shown in phantom lines in FIG. 2. When the sliding sections are moved from the projected to the retracted positions, they all arrive simultaneously at the fully retracted position wherein the leading edge 38 of each of the sliding sections is aligned simultaneously with the leading edge 7 of the U-shaped channel 5.

FIG. 6 shows a modified form of the invention in which a separate fluid motor 80 is connected to each of the sliding sections 17, 19, 21 and 23 for moving it between the retracted and projected position. The structure and arrangement of the sliding sections and of the U-shaped channel is substantially the same as that already described, and therefore, the reference numerals designating parts in FIGS. 1–5 are employed to designate like parts in FIG. 6.

Each fluid motor 80 is of the double acting type and is connected with a source of fluid under pressure by means of the flexible lines 88 and 90. These lines extend to suitable control means accessible to the pilot of the plane for actuating the fluid motors 80 and thus moving the sliding sections 17, 19, 21 and 23 between the retracted and the projected positions. The fluid motor 80 associated with each section 17, 19, 21 and 23 is secured at one end to a support 82 fixed within the housing 29 and the piston rod 84 of the fluid motor 80 is connected at its free end to a support 86 fixed within the tube 41 of the corresponding section.

While preferred structural arrangements have been described and disclosed, obviously a fewer or a greater number of sliding sections could be provided in the wing channel, depending upon the structure involved and the results desired. While the sliding sections have been described as being moved to the fully projected or fully retracted positions, they could also be selectively moved to any position intermediate the fully projected or retracted positions and secured in any position by a suitable holding means incorporated, for example, in the motor 67 or other comparable drive means. Furthermore, it is to be understood that more than one channel may be provided in the wing section on each side of the fuselage. Also, the channel need not be airfoil-shaped in cross section as shown in the drawings, but it can have its upper and lower surfaces symmetrical when viewed in cross-section.

While certain representative embodiments and details have been shown for the purposes of illustrating the invention, it will be apparent to those skilled in the art that various changes and modifications may be made therein without departing from the spirit and scope of the invention.

What I claim is:

1. In an aircraft having a lifting wing with an upwardly open channel extending generally longitudinally of the aircraft, at least a portion of the surface of the channel extending rearwardly from the leading edge thereof comprising a plurality of movable sections disposed in side by side relationship, said movable sections including a center section disposed at the bottom of the channel and midway between the opposite sides thereof and at least one lateral section disposed on either side of the center section, said movable sections being elongated, said central section being of greater length than said lateral sections, means mounting said sections on the wing for fore and aft movement between a retracted position with the leading edge of each of said sections coextensive with the leading edge of the channel and extending rearwardly from the leading edge of the channel to at least substantially midway between the leading and the trailing edges thereof and a projected position with the leading edge of each of said sections extending forwardly beyond the leading edge of the channel, and means operably connected with each of said sections for moving said sections between said retracted and said projected positions, including means for moving them simultaneously and for moving the central section a greater distance than said lateral sections.

2. An aircraft according to claim 1, in which a plurality of lateral sections are disposed on either side of said center section and the length of the lateral sections decreases progressively as the distance between the sections and the center section increases.

3. An aircraft according to claim 1, in which said means for moving said sections also includes a fluid motor operably connected with each movable section.

4. An aircraft according to claim 1, in which said means for moving said sections also includes a gear rack fixed to each movable section, a drive gear engaged with each of said racks, an articulated drive shaft connected with each of said drive gears, and motor means connected with said drive shaft.

* * * * *